(12) United States Patent
Lee (10) Patent No.: US 8,220,329 B2
(45) Date of Patent: Jul. 17, 2012

(54) MANAGEMENT SYSTEM FOR MEMS INERTIAL SENSORS

(75) Inventor: James M. Lee, Northborough, MA (US)

(73) Assignee: Analog Devices, Inc., Norwood, MA (US)

( * ) Notice: Subject to any disclaimer, the term of this patent is extended or adjusted under 35 U.S.C. 154(b) by 483 days.

(21) Appl. No.: 12/408,536

(22) Filed: Mar. 20, 2009

(65) Prior Publication Data

US 2009/0293615 A1 Dec. 3, 2009

Related U.S. Application Data

(60) Provisional application No. 61/038,594, filed on Mar. 21, 2008, provisional application No. 61/049,590, filed on May 1, 2008, provisional application No. 61/078,923, filed on Jul. 8, 2008.

(51) Int. Cl.
*G01P 15/00* (2006.01)
(52) U.S. Cl. ........................ 73/514.01; 73/491
(58) Field of Classification Search ............... 73/514.01
See application file for complete search history.

(56) References Cited

U.S. PATENT DOCUMENTS

| | | | |
|---|---|---|---|
| 4,862,394 A | 8/1989 | Thompson et al. | |
| 6,434,642 B1 | 8/2002 | Camilleri et al. | |
| 7,212,944 B1 | 5/2007 | Kohler et | |
| 7,350,424 B2 | 4/2008 | Hjelt et al. | |
| 2001/0008577 A1 | 7/2001 | Yamada et al. | |
| 2005/0212912 A1* | 9/2005 | Huster | 348/155 |
| 2005/0216867 A1* | 9/2005 | Marvit et al. | 715/863 |
| 2007/0169551 A1* | 7/2007 | Kelly | 73/514.01 |
| 2007/0245826 A1 | 10/2007 | Cardarelli | |
| 2007/0257885 A1* | 11/2007 | Liberty | 345/158 |
| 2007/0273463 A1 | 11/2007 | Yazdi | |
| 2008/0016961 A1 | 1/2008 | Dwyer et al. | |
| 2008/0190198 A1 | 8/2008 | Prandi et al. | |
| 2008/0190199 A1 | 8/2008 | Prandi et al. | |
| 2008/0190200 A1 | 8/2008 | Caminada et al. | |
| 2009/0002345 A1* | 1/2009 | Burstrom | 345/179 |
| 2009/0007661 A1 | 1/2009 | Nasiri et al. | |
| 2009/0019932 A1 | 1/2009 | Cardarelli | |

FOREIGN PATENT DOCUMENTS

JP 2005241503 A 9/2005

OTHER PUBLICATIONS

Analog Devices, Inc., "The Five Motion Senses: Using MEMS Inertial Sensing to Transform Application," http://www.analog.com/en/mems/high-g-accelerometers/products/overview/over_Five_Motion_Senses/resources/fca.html, 3 pages (retrieved Jul. 23, 2009).
Ermolov et al., "Microsystem Technologies for Mobile Communication Products," Nokia Research Center, 7 pages (2001).

(Continued)

*Primary Examiner* — Lisa Caputo
*Assistant Examiner* — Roger Hernandez-Prewitt
(74) *Attorney, Agent, or Firm* — Sunstein Kann Murphy & Timbers LLP (57) ABSTRACT

A MEMS system includes an inertial sensor having sensor circuitry and management circuitry implemented with the sensor circuitry. The management circuitry includes a detection module that detects a condition of the system and a management module that coordinates the functionality of the inertial sensor and the detection module based on the detected condition.

20 Claims, 5 Drawing Sheets

OTHER PUBLICATIONS

Price et al., "A Secure Key Management Scheme for Sensor Networks," Proceedings of the Tenth Americas Conference on Information Systems, pp. 1739-1745 (2004).

International Searching Authority, International Search Report and Written Opinion, Application No. PCT/US2009/037852, dated Feb. 12, 2010 (9 pages).

* cited by examiner

MANAGEMENT SYSTEM FOR MEMS INERTIAL SENSORS

CROSS-REFERENCE TO RELATED APPLICATIONS

This patent application claims priority to U.S. Provisional Patent Application No. 61/038,594 filed Mar. 21, 2008, entitled ACTIVITY DETECTION IN MEMS ACCELEROMETERS, U.S. Provisional Patent Application No. 61/049,590 filed May 1, 2008, entitled MANAGEMENT SYSTEM AND METHOD FOR MEMS INERTIAL SENSORS, and U.S. Provisional Patent Application No. 61/078,923 filed Jul. 8, 2008, entitled SYSTEM AND METHOD FOR CAPTURING AN EVENT IN MEMS INERTIAL SENSORS, each disclosure of which is incorporated by reference herein in its entirety.

This patent application is also related to U.S. patent application entitled ACTIVITY DETECTION IN MEMS ACCELEROMETERS having and U.S. patent application entitled SYSTEM AND METHOD FOR CAPTURING AN EVENT IN MEMS INERTIAL SENSORS having, which are filed on the same day as the present application, each disclosure of which is incorporated by reference herein in its entirety.

FIELD OF THE INVENTION

The invention generally relates to MEMS inertial sensors and, more particularly, the invention relates to effective management of MEMS inertial sensors.

BACKGROUND OF THE INVENTION

A variety of different applications use sensor systems to detect the movement of an underlying object. Sensors employing microelectromechanical systems (MEMS) devices are increasingly used in such applications due to their relatively small size and their capability to detect relatively small changes in the measured item. MEMS inertial sensor devices, e.g., accelerometers or gyroscopes, typically employ a movable, inertial mass formed with one or more fixed, non-moving structures. For example, in a MEMS accelerometer, the inertial mass may be suspended in a plane above a substrate and movable with respect to the substrate. The movable structure and the fixed structures form a capacitor having a capacitance that changes when the movable structure moves relative to the fixed structures in response to applied forces, such as along a predetermined axis of the device, e.g., x-, y- and z-axes.

Currently, inertial sensors may be used for monitoring the interaction of users with electronic devices, such as gaming devices, cell phones, personal digital assistants, etc. The inertial sensors in the devices may sense a movement above a particular threshold or a change in orientation. The sensors typically cooperate with a central computer or microprocessor that both coordinates their function and responds to specific types of detected movement. Upon detection of a specific type of movement, the sensors may transmit motion data to the central computer, which causes systems within the device to respond in a specified manner. For example, if the sensor(s) detect a tap by the user (e.g., similar to a mouse click), the device's microprocessor may initiate a response, such as turn on the device. Similarly, if the sensor. . (s) detect a rotation, e.g., the user turns the display 180 degrees, the device's microprocessor may change the orientation of the image display.

At present, there is no integrated, automated method for an inertial sensor to indicate different conditions of the device, e.g., its active or inactive state, without interaction with the microprocessor. These functions usually exist separately from the inertial sensor. Typically, the microprocessor or controller periodically (or continuously) monitors the acceleration data from the inertial sensor to determine the state of the device.

SUMMARY OF THE INVENTION

In accordance with one embodiment of the invention, a MEMS system includes an inertial sensor having sensor circuitry and management circuitry implemented with the sensor circuitry. The management circuitry includes a detection module that detects a condition of the system and a management module that coordinates the functionality of the inertial sensor and the detection module based on the detected condition.

In accordance with another embodiment of the invention, a management system for a MEMS inertial sensor includes a detection module that detects a condition of the inertial sensor and a management module that modifies a configuration of the inertial sensor based on the detected condition.

In accordance with another embodiment of the invention, a MEMS system includes an inertial sensor having sensor circuitry and a management system for the inertial sensor. The management system is implemented with the sensor circuitry and includes a detection module that detects a condition of the system and a management module that coordinates the functionality of the inertial sensor and the detection module based on the detected condition.

In some embodiments, the system may further include memory operatively coupled with the management module and the detection module. The memory may be capable of storing data values produced by the inertial sensor. The condition may be a designated amount of data values stored in the memory. The system may further include a microprocessor in communication with the inertial sensor and the management circuitry. The management module may inform the microprocessor that the designated amount of data values are stored in the memory. The memory may store the data values received by the inertial sensor in a first-in-first-out buffer type of configuration, a stream buffer type of configuration, or both.

Alternatively, or in addition, the condition may be an activity or inactivity condition of the inertial sensor. The detection module may determine the activity condition of the inertial sensor by calculating a change in acceleration and comparing the change in acceleration to a threshold. The change in acceleration may be determined using an acceleration bias captured by the inertial sensor and a measured acceleration produced by the inertial sensor. The measured acceleration may be produced by the inertial sensor at a predetermined period of time and the management module may modify the predetermined period of time when activity is detected. The detection module may determine the inactivity condition of the inertial sensor by calculating a change in acceleration, comparing the change in acceleration to a threshold, determining if the change in acceleration is less than the threshold, and if the change in acceleration is less than the threshold, determining if a predetermined period of time has elapsed. The change in acceleration may be determined using an acceleration bias captured by the inertial sensor and a measured acceleration produced by the inertial sensor. The measured acceleration may be produced by the inertial sensor at a predetermined period of time and the management module may modify the predetermined period of time when inactivity is detected. The inertial sensor may be formed on a die, and the sensor circuitry and management circuitry may be formed on or in the same die. The sensor circuitry and management circuitry may be formed on or in a first die, and the inertial sensor may be formed on or in a second die that is in communication with the first die. The inertial sensor may include an accelerometer or a gyroscope.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Various embodiments of the present invention provide a system and method for intelligent management of inertial sensor functions by embedding functionality in sensor-specific circuitry. For example, if the sensor is an accelerometer, the functionality may be embedded in the accelerometer circuitry. Thus, various embodiments include a sensor management system that uses digital logic and state machines. The sensor management system may be coupled with one or more sensors to effectively manage different conditions of the device without interaction with the device's central computer or microprocessor (excluding the sensor's interaction with the microprocessor during its initial configuration). For instance, the inertial sensor does receive some initial input from the microprocessor, such as initial configurations or settings, e.g., threshold values, which may be set manually by the user or automatically. The sensor management system coordinates the sensor's functions and responds to specific types of detected movement in order to provide efficient management of the MEMS inertial sensor. By embedding the functionality in the sensor management system, benefits may be realized, such as achieving maximal power savings, since only the sensor and the sensor management system may need to be powered, rather than the device's microprocessor. Details of illustrative embodiments are discussed below.

Figure 1:
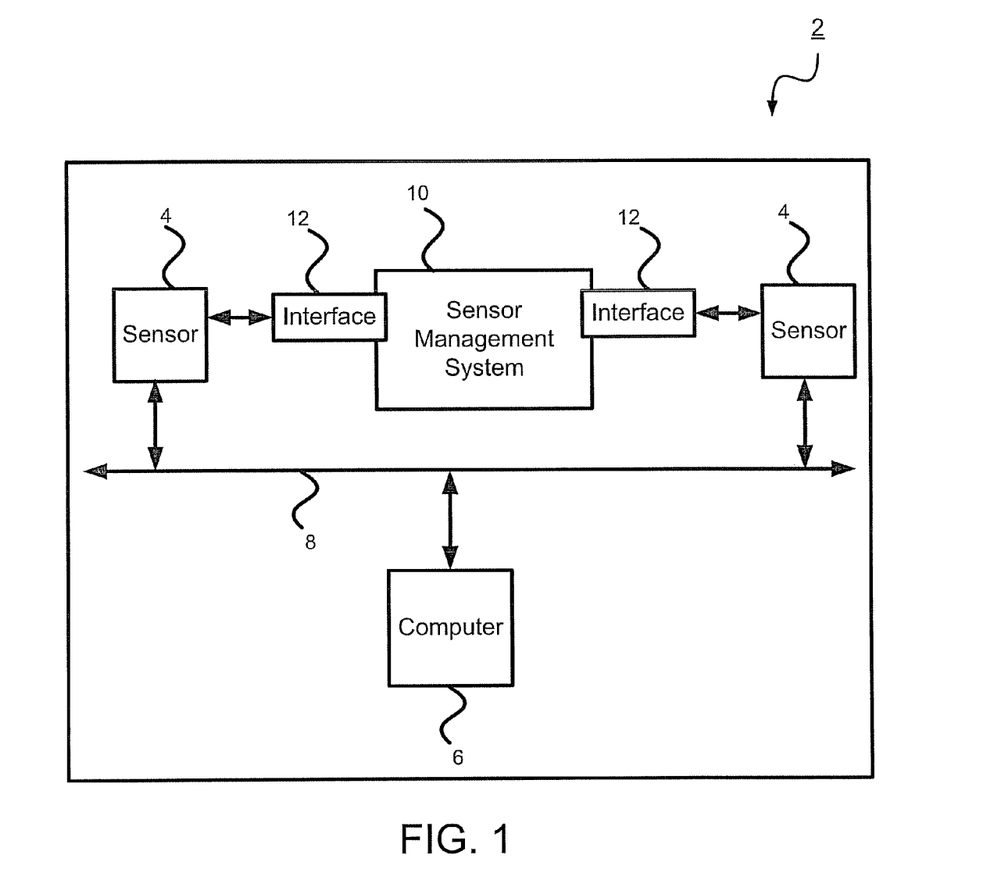
FIG. 1 schematically shows a simplified view of a sensor system in accordance with illustrative embodiments of the invention.

As shown in FIG. 1, various embodiments may include a sensor system 2 having one or more inertial sensors 4 that communicate with a central computer or microprocessor 6 through some interconnection medium 8. The sensor system 2 may also include one or more sensor management systems 10 in communication with the inertial sensor(s) 4. The inertial sensor(s) 4 may produce data values, e.g., motion data related to the detected movement of an object, which may be transmitted to the microprocessor 6 via interconnection 8 and/or the sensor management system 10 through the management system's interface 12, as discussed in more detail below.

Although FIG. 1 shows two inertial sensors 4 with one management system 10, one sensor 4 may be used with one or more management systems 10 and/or two or more inertial sensors 4 may be used with one or more management systems 10.

Figure 2:
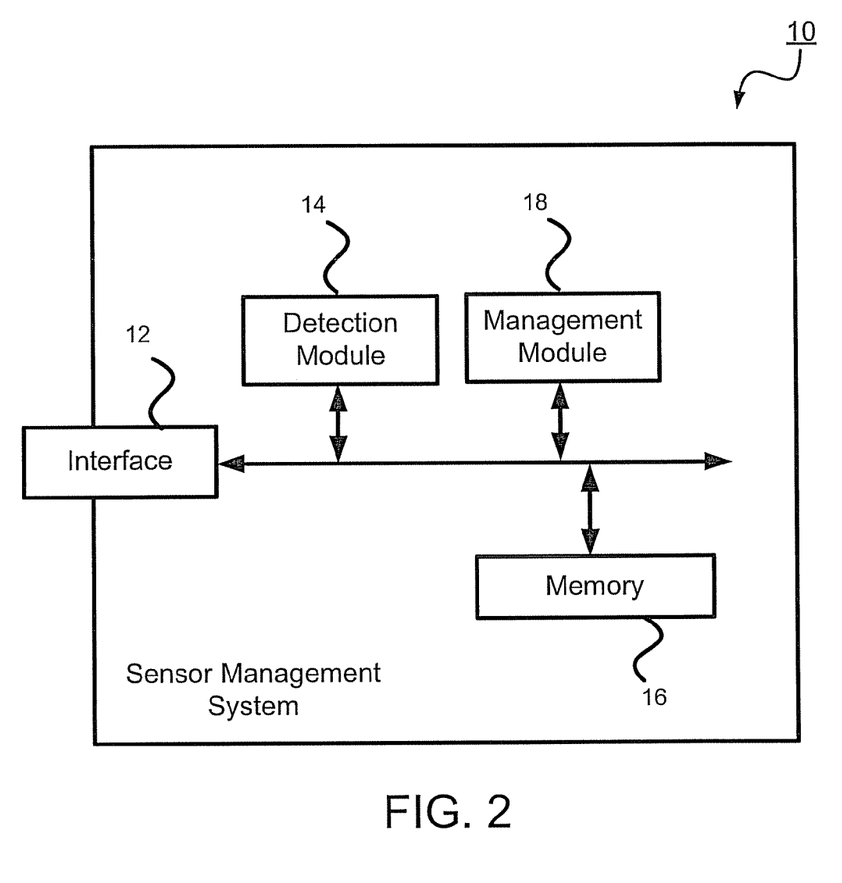
FIG. 2 schematically shows a sensor management system in accordance with illustrative embodiments of the invention.

FIG. 2 schematically shows a block diagram of a sensor management system 10 in accordance with illustrative embodiments of the invention. The sensor management system 10 may include an interface 12 for communicating with external devices, such as the inertial sensor(s) 4 (e.g., for receiving data produced by the sensors and sending data to the sensors) or the microprocessor 6, and a detection module 14 for processing the data values received and detecting whether certain types of motion have occurred, e.g., activity/inactivity detection, free fall detection, tap or double tap detection, etc. The sensor management system 10 may also include memory 16 for storing or collecting the data values received from the external devices and the data values processed by the detection module 14.

The sensor management system 10 may also include a management module 18 that may modify the sensor's configuration. For example, various parameters may be set in the sensor(s) 4 by the management module 18 (e.g., parameters may be set based on whether activity or inactivity is detected, free fall is detected, a tap or double tap is detected by the detection module 14). In some embodiments, for example, the rate the acceleration is measured from the accelerometer may vary depending upon whether activity or inactivity is detected. For instance, a more frequent sample rate may be used by the sensor 4 when activity is detected or monitored by the detection module 14 rather than when inactivity is detected or monitored.

In addition, or alternatively, the management module 18 may coordinate the functionality of the detection module 14. For example, in some embodiments, it may be desirable to look for activity after inactivity is detected and vise-versa. Thus, the management module 18 may instruct the detection module 14 when to look for activity and/or inactivity. By coordinating the activity detection and inactivity detection functions in the detection module 14, intelligent management of the accelerometer functions may be achieved, e.g., effective automated power management.

In addition, or alternatively, the management module 18 may coordinate the functionality of the sensor(s) 4 and the sensor management system 10 with the device's microprocessor 6. For example, in some embodiments, it may be desirable to store a certain amount of data values received from the sensor 4 in the memory 16 in order to minimize the sensor's interaction with the device's microprocessor 6. In this way, the management module 18 may monitor the amount of data in memory 16 and instruct the device's microprocessor 6 when to read the data once a certain amount has been stored. Thus, by coordinating the sensor 4 and memory 16 functions with the management module 18, intelligent management of the accelerometer functions may be achieved, providing an effective power management system. The functionality of the sensor management system 10, and its detection module 14 and management module 18, are discussed in greater detail below with regard to embodiments of its implementation.

Figure 3:
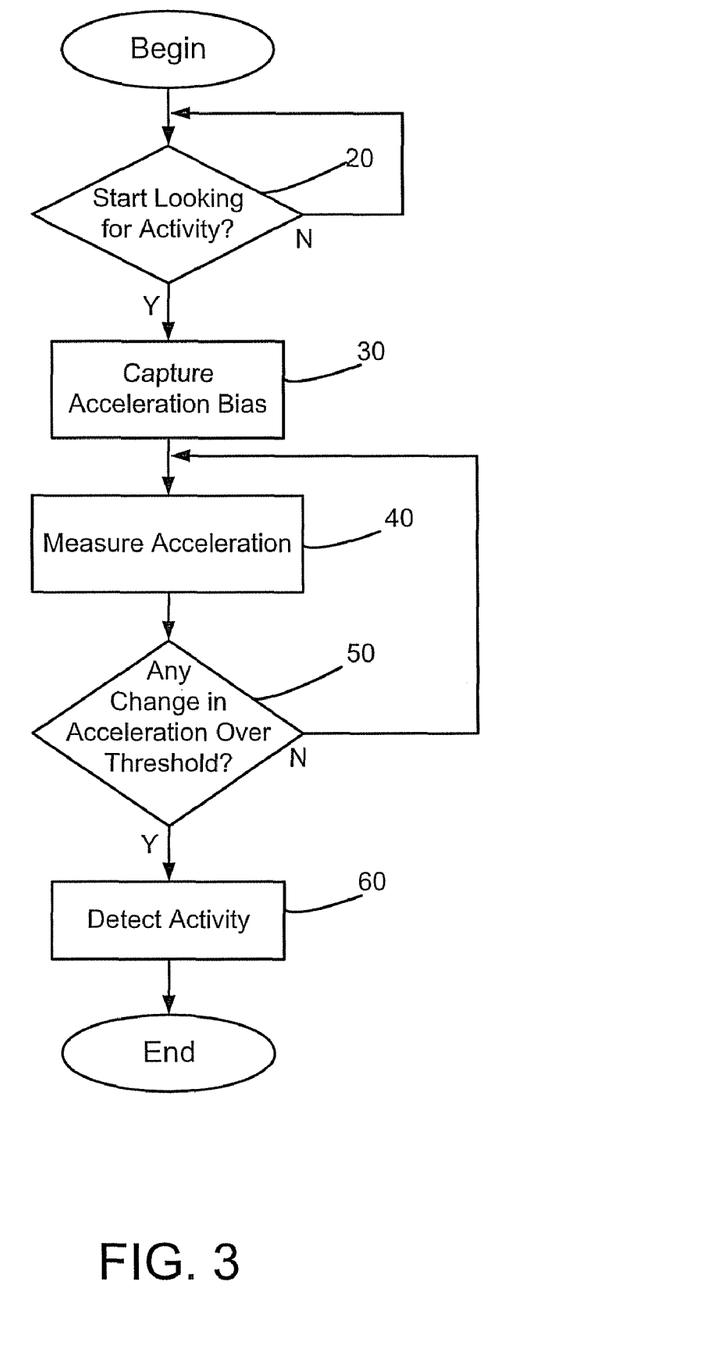
FIG. 3 shows a process of detecting activity in a MEMS accelerometer according to embodiments of the present invention.

FIG. 3 shows a process of detecting activity that may be performed by the sensor management system's 10 detection module 14 according to illustrative embodiments of the present invention. Thus, in some embodiments, the detection module 14 may include a computational component and a comparator (not shown) as discussed further below. The process begins at step 20, which decides whether to start looking for activity. The detection module 14 may start to look for activity automatically at designated times, (e.g., when the device is turned on or at periodic intervals) or manually, (e.g., when the user actively initiates a request such as tapping on a device screen). Alternatively, or in addition, the management module 18 may instruct the detection module 14 to start to look for activity once inactivity is detected (inactivity detection is discussed in greater detail below with regard to FIG. 4).

In step 30, an acceleration offset or bias may be captured upon the start of looking for activity. This may be accomplished by having the detection module 14 capture a snapshot of the current acceleration or orientation of the device and digitally store the value as the acceleration bias in memory 16.

In step 40, the acceleration of the device may be measured by the sensor(s) 4 and the data values stored in memory 16. The acceleration may be measured on one or more axes of the device (e.g., x-, y-, and/or z-axis), which may be determined automatically or manually (e.g., set by the user). The accelerometer may sample the acceleration data at a data rate. The management module 18 may determine the sensor's 4 data rate depending on the current detected state of the device by the detection module 14. For example, the accelerometer sample rate may be set to a desired "awake" mode or more frequent sampling rate when activity is detected or monitored by the detection module 14. Similarly, the accelerometer sample rate may be set to a desired "sleep" mode or more infrequent sampling rate when inactivity is detected/monitored. When the detection module 14 has yet to determine activity and/or inactivity, the management module 18 may set a default value for the sensor's 4 sample rate, e.g., sleep mode sampling rate, awake mode sampling rate, or some other sampling rate, until the detection module 14 determines the current detected state of the device. Although one mode is discussed for when activity or inactivity is detected/monitored, the management module 18 may set two or more different modes during a given state of the device.

In step 50, the detection module 14 calculates the change in acceleration and verifies whether that change is greater than or equal to a threshold. The detection module 14 may determine the change in acceleration by calculating the difference between the current measured acceleration and the digitally stored acceleration bias using the computational component. The detection module 14 may then compare an absolute value of the change in acceleration to a threshold value using the comparator. The detection module 14 performs these calculations and the measured acceleration values, the calculated difference and the threshold value may be stored in the memory 16. The threshold may be set automatically or manually and may be the same or different for different axes. If the change in acceleration is less than the threshold, then the process returns to step 40 where the acceleration may be measured again. If the change in acceleration is greater than or equal to the threshold, then the process proceeds to step 60, where activity is detected. When activity is detected by the detection module 14, it may inform the management module 18 of the current detected state of the device. The management module 18 may then send instructions or parameters to the inertial sensor 4 via the interface 12 as discussed above (e.g., setting sampling rates), and may send instructions back to the detection module 14, e.g., start to look for inactivity. Thus, the detection module 14 may optionally start to look for inactivity once activity is detected.

Figure 4:
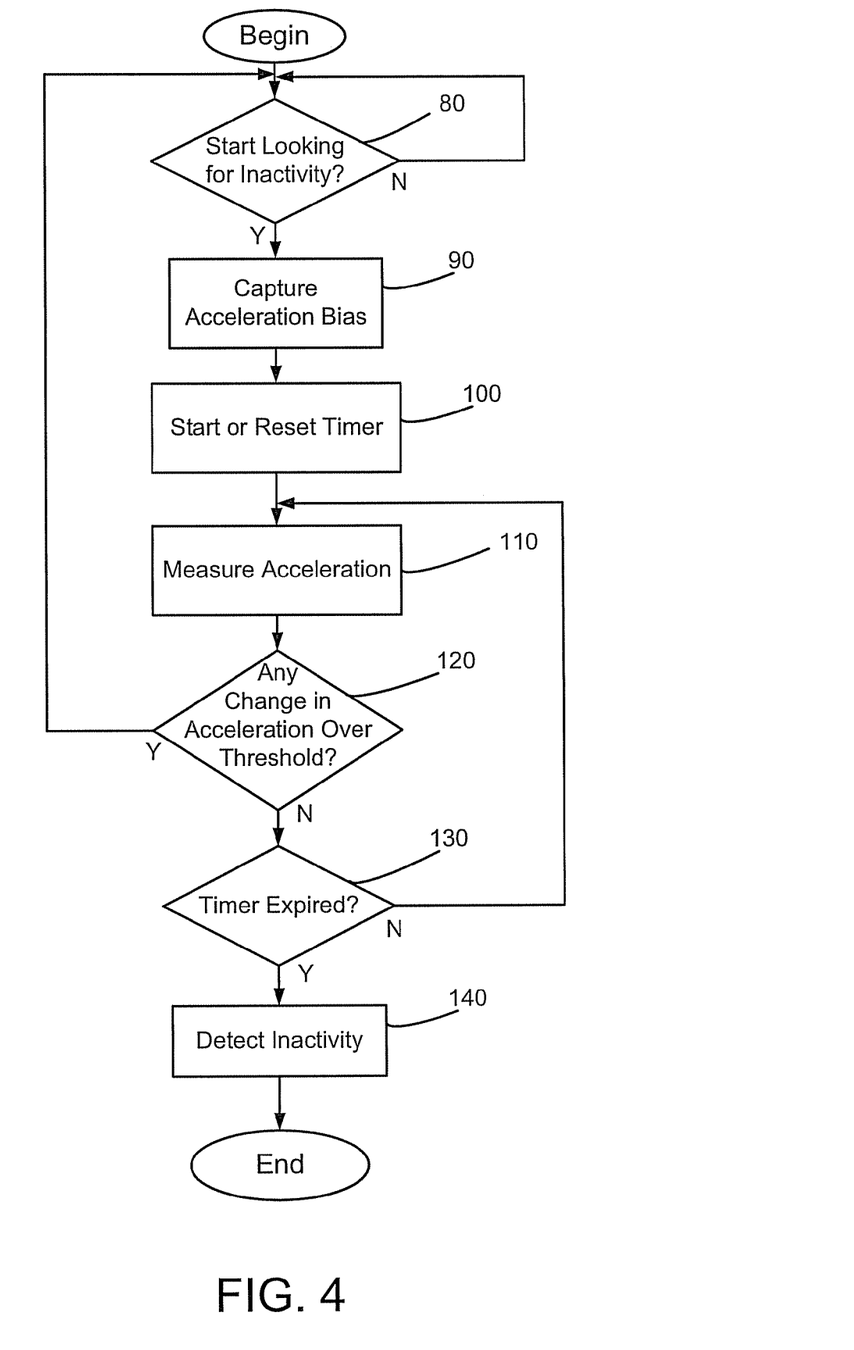
FIG. 4 shows a process of detecting inactivity in a MEMS accelerometer according to embodiments of the present invention.

FIG. 4 shows a process of detecting inactivity that may be performed by the sensor management system's 10 detection module 14 according to illustrative embodiments of the present invention. Inactivity detection is similar to activity detection although a timer may be used. Thus, in some embodiments, the detection module 14 may include a timer along with the computational component and comparator (not shown). The process begins at step 80, which decides whether to start looking for inactivity. The detection module 14 may start to look for inactivity automatically at designated times, (e.g., when the device is turned off or at periodic intervals) or manually, (e.g., when the user actively initiates a request such as tapping on a device screen). Alternatively, or in addition, the management module 18 may instruct the detection module 14 to start to look for inactivity once activity is detected.

In step 90, an acceleration offset or bias may be captured by the detection module 14 upon the start of looking for inactivity. This step is similar to step 30 in the activity detection process described above. In step 100, the detection module's 14 timer may be started or reset. In step 110, the acceleration of the device may be measured, similar to step 40 described above.

In step 120, the detection module 14 calculates the change in acceleration and verifies whether that change is greater than or equal to a threshold, similar to step 50 described above. The threshold may be set automatically or manually and may be the same or different for different axes. The inactivity threshold may also be the same or different than the activity threshold. If the change in acceleration is greater than or equal to the given threshold in any of the measured axes, then the process returns back to step 80. If the change in acceleration is less than the given threshold for all of the measured axes, then the process proceeds to step 130.

In step 130, the detection module 14 verifies whether a predetermined period of time has elapsed, e.g., by determining whether the timer has expired. If the timer has not expired, then the process returns to step 110 and the acceleration may be measured again. If the timer has expired, then the process proceeds to step 140, where inactivity is detected. The predetermined period of time may be set automatically or manually. When inactivity is detected by the detection module 14, it may inform the management module 18 of the current detected state of the device. The management module 18 may then send instructions or parameters to the inertial sensor 4 via the interface 12 as discussed above (e.g., setting sampling rate parameters), and may send instructions back to the detection module 14, e.g., start to look for activity. Thus, the detection module 14 may optionally start to look for activity once inactivity is detected.

As mentioned above, various parameters may be set in the inertial sensor(s) 4 by the management module 18. Although the sampling rate parameter is mentioned above, discussion of a specific parameter is exemplary and not intended to limit the scope of various embodiments of the invention. Other parameters in the inertial sensor(s) 4 may also be set by the management module 18 as known by those skilled in the art. In addition, the management module 18 may set parameters in the detection module 14 and/or the memory 16 along with, or instead of, the sensor(s) 4.

Although FIGS. 3 and 4 discuss detecting activity or inactivity, other types of specific motion may be detected by the detection module 14 (e.g., free fall detection, tap/double tap detection, trigger event detection) and then coordinated with the management module 18. Thus, the discussion of activity/inactivity detection is exemplary and not intended to limit the scope of various embodiments of the invention. In addition, some embodiments may use other techniques for detecting activity and inactivity.

Figure 5:
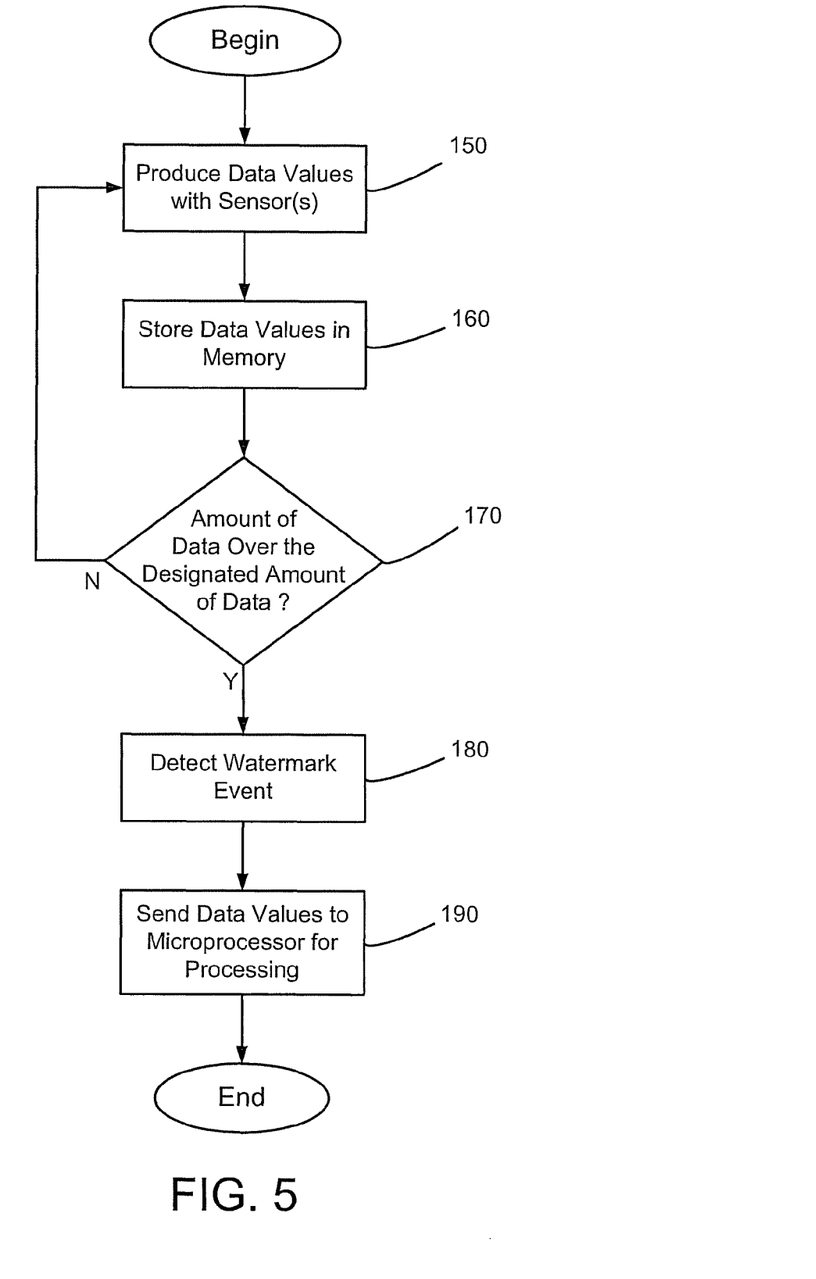
FIG. 5 shows a process of detecting a watermark event with the sensor management system in accordance with illustrative embodiments of the invention.

In addition, or alternatively, the detection module 14 may detect certain events in the sensor management system 10 which may cause other events or processes to occur within the sensor management system 10 or the sensor system 2. For example, FIG. 5 shows a process for detecting a watermark event according to illustrative embodiments of the present invention. As shown, the sensor(s) 4 may produce data values (step 150), which may be stored in the memory 16 (step 160) in order to minimize the interaction with the device's microprocessor 6. In some embodiments, the memory 16 may store the data values received by the sensor(s) 4 in a first-in-first-out (FIFO) buffer mode or type of configuration. As well known to those skilled in the art, a FIFO buffer does not allow newer data to be saved when the buffer is full, so that older data may be preserved for later processing. In some embodiments, the memory 16 may store the data values received by the sensor (s) 4 in a stream buffer mode or type of configuration. As well known to those skilled in the art, a stream buffer contains a specified amount of the most recent data received, depending on the size of the buffer's memory (e.g., a minute's worth of the most recent data). When storing data to a stream buffer that is full, the oldest data is written over or removed and replaced with the newest data received. In some embodiments, the memory 16 may store the data values received by the sensor(s) 4 in a stream buffer mode and then a FIFO buffer mode, or a FIFO buffer mode and then a stream buffer mode.

In step 170, the detection module 14 may then determine whether some data, or a certain designated amount of data, is in the memory 16. The designated amount of data may be set manually by the user or automatically, and may be the same value or a different value depending on the detected state of the sensor (e.g., inactive state may have a larger amount of data stored than an active state). If the amount of data is less than the designated amount of data, then the process returns to step 150, where the sensor(s) 4 again produce data values which may be stored in the memory 16 (step 160). If the amount of data is greater than or equal to the designated amount of data, then the process proceeds to step 180, where a watermark event is detected. Once the detection module 14 detects the watermark event, then the detection module 14 may notify the management module 18 of such an event and the management module 18 may instruct the device's microprocessor 6 to read the data (step 190).

In this way, the management module 18 may more efficiently coordinate the sensor(s) 4 and the sensor management system's 10 interaction with the device's microprocessor 6, providing an effective power management system. This is in contrast to the sensor(s) 4 sending the data directly to the microprocessor 6 or the microprocessor 6 having to continuously or periodically poll the memory 6 to read the data whether or not any data, or a significant amount of data, has been produced. Also, when a signal interrupt is sent to the microprocessor informing it that data has been produced, sometimes it takes a brief period for the microprocessor to finish its other tasks before the microprocessor is ready to receive or process the data generated by the sensor. When this happens, valuable data may be lost during this time. Embodiments of the present invention thus minimize or prevent data from being lost due to the latency of the microprocessor, improving the overall performance of the sensor system 2.

Although FIG. 5 discusses detecting a watermark event, other types of events may be detected by the detection module 14. For example, the detection module 14 may detect an overrun event in the memory 16, which may signal that the memory 16 is full and newer data may be lost. Thus, the discussion of detecting specific events is exemplary and not intended to limit the scope of various embodiments of the invention.

Although inertial sensors 4 such as accelerometers are discussed above, principles of illustrative embodiments may apply to other inertial sensors or sensor devices, such as MEMS gyroscopes and MEMS pressure sensors or microphones. Accordingly, discussion of inertial sensors is exemplary and not intended to limit the scope of various embodiments of the invention.

Among other implementations, the detection module 14 and the management module 18 may be a single integrated unit having the discussed functionality, and/or a plurality of interconnected, separate functional devices. Reference to a "module" therefore is for convenience and not intended to limit its implementation. Moreover, the various functionalities within the detection module 14 and/or the management module 18 may be implemented in any number of ways, such as by means of one or more application specific integrated circuits or digital signal processors, or the discussed functionality may be implemented in software.

In some embodiments of the present invention, certain motion detection (e.g., activity/inactivity detection) may be determined independently of one another and/or concurrently. In some embodiments, certain motion detection (e.g., activity detection) may be dependent upon detecting other types of motion (e.g., detecting inactivity) and vise-versa. For example, as mentioned above, the start of looking for activity (step 20) may be based on having detected inactivity and the start of looking for inactivity (step 80) may be triggered by having detected activity. For instance, once inactivity is detected, the sample rate of the sensor 4 may be slowed to a "sleep" rate to further reduce power consumption.

All or part of the functionality of the sensor management system 10 may be implemented in management circuitry, which may be implemented as part of the sensor-specific circuitry. For example, if the sensor is an accelerometer, then all or part of management circuitry may be integrated with the accelerometer or sensor circuitry. For instance, the management circuitry may include the activity and inactivity functions, which may be embedded in the accelerometer for power control of the end device. This may be accomplished by using digital logic and state machines closely embedded with the accelerometer. For example, the management circuitry may detect an acceleration above a particular threshold or a change in orientation and transmit such motion data to other circuitry for further processing. Sensor-specific circuitry that includes the management circuitry may be on the same chip or die as the sensor itself, or on a different chip or die. As another example, the sensor-specific circuitry with the management circuitry may be implemented on an application specific integrated circuit (ASIC), while the sensor may be on a sensor chip with no circuitry (other than pads for wirebonding with the ASIC). Both the ASIC and sensor chip may be within a single package, or in separate packages.

Embodiments may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the method and system. Those skilled in the art should appreciate that such computer instructions may be written in a number of programming languages for use with many computer architectures or operating systems. For example, embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Thus, some embodiments of the invention may be implemented as hardware, software (e.g., a computer program product), or a combination of both software and hardware.

Although the above discussion discloses various exemplary embodiments of the invention, it should be apparent that those skilled in the art can make various modifications that will achieve some of the advantages of the invention without departing from the true scope of the invention.

What is claimed is:

1. A MEMS system that interacts with a microprocessor, the MEMS system comprising:
    a MEMS inertial sensor configured to detect motion and produce data values related to the detected motion;
    memory operatively coupled with the MEMS inertial sensor, the memory being configured to receive and store the data values from the MEMS inertial sensor;
    a detection module operatively coupled with the MEMS inertial sensor and the memory, the detection module being configured to process the data values and to detect an inertial state of the MEMS inertial sensor based on the processed data values, the inertial state including an active state and an inactive state, the MEMS system configured to store the data values, the processed data values, or both in the memory in both the active state and the inactive state, the detection module being configured to detect an amount of data stored in the memory; and
    a management module operatively coupled with the detection module and the memory, the management module being configured to receive the detected inertial state of the MEMS inertial sensor from the detection module, the management module being configured to signal the microprocessor to read the data values stored in the memory based on the inertial state and/or the amount of the data stored in the memory.

2. The system of claim 1, further comprising the microprocessor in communication with the management module and the memory.

3. The system of claim 1, wherein the memory stores the data values received by the inertial sensor in a first-in-first-out buffer type of configuration, a stream buffer type of configuration, or both.

4. The system of claim 1, wherein the inertial state further includes free fall detection, tap detection, double tap detection, and change in orientation detection.

5. The system of claim 4, wherein the memory stores the data values in a stream buffer type of configuration when in one inertial state, and the memory stores the data values in a first-in-first-out buffer type of configuration when in another inertial state.

6. The system of claim 1, wherein the detection module detects the active state by calculating a change in acceleration and comparing the change in acceleration to a threshold, wherein the change in acceleration is determined using an acceleration bias captured by the inertial sensor and a measured acceleration produced by the inertial sensor.

7. The system of claim 6, wherein the measured acceleration produced by the inertial sensor is measured at a sample rate, and the management module modifies the sample rate when the active state is detected.

8. The system of claim 1, wherein the detection module detects the inactive state by calculating a change in acceleration, comparing the change in acceleration to a threshold, determining if the change in acceleration is less than the threshold, and if the change in acceleration is less than the threshold, determining if a predetermined period of time has elapsed, wherein the change in acceleration is determined using an acceleration bias captured by the inertial sensor and a measured acceleration produced by the inertial sensor.

9. The system of claim 8, wherein the measured acceleration produced by the inertial sensor is measured at a sample rate, and the management module modifies the sample rate when the inactive state is detected.

10. The system of claim 1, wherein the inertial sensor is formed on a die and the management module is formed on or in the die.

11. The system of claim 1, wherein the management module is formed on or in a first die, and the MEMS inertial sensor is formed on or in a second die that is in communication with the first die.

12. The system of claim 1, wherein the inertial sensor is an accelerometer.

13. The system of claim 1, wherein the inertial sensor is a gyroscope.

14. A management system for a MEMS inertial sensor, the system comprising:
    memory configured to receive and store data values from the MEMS inertial sensor;
    a detection module operatively coupled with the memory, the detection module being configured to process the data values and to detect an inertial state of the MEMS inertial sensor based on the processed data values, the inertial state including an active state and an inactive state, the management system configured to store the data values, the processed data values, or both in the memory in both the active state and the inactive state, the detection module being configured to detect an amount of data stored in the memory; and
    a management module operatively coupled with the detection module and the memory, the management module being configured to receive the detected inertial state of the MEMS inertial sensor from the detection module and to modify a configuration of the memory based on the detected inertial state.

15. The management system of claim 14, wherein the management module is further configured to signal a microprocessor to read the data values stored in the memory based on the inertial state and/or the amount of the data stored in the memory.

16. The management system of claim 14, wherein the configuration of the memory is a first-in-first-out buffer type of configuration, a stream buffer type of configuration, or both.

17. The management system of claim 14, wherein the inertial state further includes free fall detection, tap detection, double tap detection, and change in orientation detection.

18. The management system of claim 17, wherein the management module modifies the configuration of the memory to a stream buffer type of configuration when in one inertial state, and modifies the configuration of the memory to a first-in-first-out type of configuration when in another inertial state.

19. The management system of claim 14, wherein the MEMS inertial sensor is an accelerometer.

20. The management system of claim 14, wherein the MEMS inertial sensor is a gyroscope.

* * * * *